United States Patent [19]

Goepel et al.

[11] Patent Number: 5,247,490

[45] Date of Patent: Sep. 21, 1993

[54] PRESSURE-COMPENSATED OPTICAL ACOUSTIC SENSOR

[75] Inventors: Charles A. Goepel, Severna Park, Md.; Frederick M. Reitz, McLean, Va.

[73] Assignee: Martin Marietta Corporation, Bethesda, Md.

[21] Appl. No.: 893,478

[22] Filed: Jun. 4, 1992

[51] Int. Cl.$^5$ .............................................. H04R 1/02
[52] U.S. Cl. .................................. 367/149; 367/151; 367/172; 356/358; 73/657
[58] Field of Search ............... 367/149, 151, 167, 172; 356/345, 352, 358; 73/657

[56] References Cited

U.S. PATENT DOCUMENTS

| | | | |
|---|---|---|---|
| 4,310,905 | 1/1982 | Palmer | 367/140 |
| 4,320,475 | 3/1982 | Leclerc et al. | 367/149 |
| 4,446,543 | 5/1984 | McLandrich et al. | 367/149 |
| 4,458,343 | 7/1984 | Tehon et al. | 367/149 |
| 4,524,693 | 6/1985 | McMahon et al. | 367/167 |
| 4,545,253 | 10/1985 | Avicola | 73/655 |
| 4,593,385 | 6/1986 | Chamuel | 367/149 |
| 4,648,083 | 3/1987 | Giallorenzi | 367/149 |
| 4,649,529 | 3/1987 | Avicola | 367/149 |
| 4,743,113 | 5/1988 | Jubinski | 356/345 |
| 4,799,752 | 1/1989 | Carome | 350/96.15 |
| 4,942,767 | 7/1990 | Haritonidis et al. | 73/705 |
| 5,051,965 | 9/1991 | Poorman | 367/149 |

OTHER PUBLICATIONS

"Handbook of Hydrophone Element Design Technology", C. LeBlanc, NUSC Technical Document No. 5813, Naval Underwater Systems Center (Oct. 11, 1978).
"Homodyne Demodulation Scheme for Fiber Optic Sensors Using Phase Generated Carrier", A. Dandridge et al., IEEE Journal of Quantum Electronics, vol. QE-18, pp. 1647-1653 (Oct., 1982).
"Fiber Optic Interferometric Sensor Arrays with Freedom from Source Phase Induced Noise", J. Brooks et al., Optics Letters, vol. 11, pp. 473-475 (Jul. 1986).
"Stability Improvement of Fiber Optic Probe Microphone by Frequency Control of the Light Source", R. Ohba et al., Journal Physics E. Sci. Instrum. 20, pp. 1380-1382 (1987).
"Overview of Multiplexing Techniques of Interferometric Fiber Sensors", A. Kersey et al., Proc. SPIE, vol. 838 Fiber Optic and Laser Sensors V, pp. 184-193 (1987).

Primary Examiner—J. Woodrow Eldred
Attorney, Agent, or Firm—Gay Chin; Bruce M. Winchell; Michael L. Slonecker

[57] ABSTRACT

There is described an optical acoustic sensor that is pressure-compensated for operation in high-pressure environments such as the deep sea and that may be employed in multi-sensor arrays. The sensor includes an acoustically responsive diaphragm that is illuminated by light conducted through an optical fiber and that reflects the light back into the fiber. Light waves reflected by the diaphragm and fiber end interfere, and the resulting interference is conducted by the optical fiber to a to a photodetector and associated signal processing electronics such as a phase generated carrier demodulator. Pressure compensation is provided to equalize the static pressure on both sides of the diaphragm. Additionally, an array of sensors is described that employs optical time division multiplexing.

4 Claims, 6 Drawing Sheets

PRESSURE-COMPENSATED OPTICAL ACOUSTIC SENSOR

BACKGROUND

The present invention relates to acoustic sensors in which a diaphragm, in response to incident acoustic waves, modulates light intensity in an optical interferometer.

Acoustic sensors employing optical techniques can be grouped in two major classes: intensity and interferometric. Intensity-based acoustic sensors vary the intensity of a continuous wave (CW) laser, or other light source, typically by disposing in the laser beam a variable optical attenuator that responds to acoustically induced motions of a diaphragm. Such devices are described in U.S. Pat. Nos. 4,458,343 to Tehon et al. and No. 4,310,905 to Palmer.

Conventional intensity-based sensors are approximately three orders of magnitude less sensitive than interferometric-based sensors, although the variable-ratio fiber-optic coupler hydrophone approaches the latter type's sensitivity. The variable-ratio coupler hydrophone utilizes a single-mode, fiber optic coupler as the sensing element and is thus generally rugged and sensitive. One such sensor is described in U.S. Pat. No. 4,545,253 to Avicola. Nevertheless, the variable-ratio coupler hydrophone suffers a major drawback for use under high pressure: it is extremely difficult to pressure compensate. Accordingly, such a coupler would not be a good candidate for use in environments such as the deep sea.

The interferometric-based acoustic sensor class can be divided into two common sensor types: fiber coil sensors and diaphragm sensors; both types can be engineered to achieve excellent sensitivity to acoustic pressure. Fiber coil sensors, which generally rely on interferogram modulation by pressure-induced refractive index changes in fiber coils, are described in U.S. Pat. Nos. 4,320,475 to Leclerc et al.; No. 4,593,385 to Chamuel; No. 4,743,113 to Jubinski and No. 4,799,752 to Carome. Nevertheless, fiber coil sensors tend to be relatively heavier and have larger parts count and cost than diaphragm sensors, and pressure compensation poses serious problems.

The fiber coil sensor used in the all-optical towed array described in U.S. Pat. No. 4,648,083 to Giallorenzi employs an air-backed compliant mandrel in its pressure compensation scheme. Present implementations of the air-backed mandrel design are limited in the pressure range over which linear operation can be obtained and are subject to permanent damage from pressure overloads. In addition, the air-backed mandrel, fiber coil hydrophone using a Mach-Zehnder or Michelson interferometer configuration is costly because of its many precision-machined components, large amount of fiber and many optical beam splitters.

An elementary diaphragm-type interferometric-based acoustic sensor is disclosed in U.S. Pat. No. 4,446,543 to McLandrich et al. Light from a laser is transmitted by an optical fiber to an optical resonator comprising the partially reflective end of the fiber and a mirror-diaphragm. The mirror moves with respect to the fiber end in response to an acoustic signal, thereby modulating the intensity of the combined reflections from the fiber end and the mirror. The reflected light is directed to a photodetector that produces an electrical signal representative of the interference pattern. Apart from the basic features of a diaphragm-type acoustic sensor, the McLandrich et al. patent fails to show methods for pressure compensating the sensor, for demodulating the reflected light that contains the acoustic information and for multiplexing the outputs of several sensors on an optical bus.

The above-cited patent to Tehon et al. shows one method of pressure-compensating a diaphragm-type hydrophone. A chamber behind the sensing diaphragm is filled with oil and communicates with a second oil-filled chamber through a capillary tube. The second chamber is subject to the ambient pressure through a second diaphragm. The capillary tube, which is sometimes called a Helmholtz tube, equalizes the hydrostatic pressure between the chambers but permits dynamic pressure differences over the frequency range of interest. To compensate for the low compliance of the oil, which would severely reduce the hydrophone's sensitivity, the Tehon et al. hydrophone includes a compliant bellows. Pressure-compensation techniques, as well as general considerations related to hydrophones, are also described in the "Handbook of Hydrophone Element Design Technology," C. LeBlanc, NUSC Technical Document No. 5813, Naval Underwater Systems Center (Oct. 11, 1978).

Among prior methods for multiplexing the outputs of a plurality of acoustic sensors on an optical fiber are the FM phase generated carrier and time-division-multiplexed phase generated carrier methods, the path matched differential interferometry technique, and the wavelength tuning method. The phase generated carrier technique is described in "Homodyne Demodulation Scheme for Fiber Optic Sensors Using Phase Generated Carrier," A. Dandridge et al., IEEE Jour. Quantum Elecs., vol. QE-18, pp. 1647–1653 (October, 1982). The path matched differential interferometry technique is described in "Fiber Optic Interferometric Sensor Arrays with Freedom from Source Induced Noise," J. Brooks et al., Optics Letters, vol. 11, pp. 473–475 (July, 1986). The wavelength tuning technique is described in "Stability Improvement of Fiber Optic Probe Microphone by Frequency Control of the Light Source," R. Ohba et al., Jour. Physics E. Sci. Instrum. 20, pp. 1380–1382 (1987). A survey of these and other methods is provided in "Overview of Multiplexing Techniques for Interferometric Fiber Sensors," A. Kersey et al., Proc. SPIE, vol. 838 Fiber Optic and Laser Sensors V, pp. 184–193 (1987).

SUMMARY

The acoustic sensor described herein has inherently low cost and state of the art performance. In addition, a pressure compensation method and configuration is provided, enabling operation at high pressures such as at deep ocean depths.

In general, an apparatus in accordance with the present invention comprises a reflective diaphragm and optical fiber for transducing a compressional mechanical displacement into a light signal, a photodetector for transducing the light signal into an electrical signal, and a signal processor for processing the electrical signal into an electrical signal characteristic of the mechanical displacement.

In a preferred embodiment, a light pulse is generated by a laser and transmitted via a single-mode optical fiber to an acoustic-sensing, thin, reflective diaphragm. The light reflected from the diaphragm and the end of the optical fiber forms an interference light signal, representing a certain acoustically induced displacement, and is detected and processed into an electrical signal representative of the acoustic displacement. Pressure compensation is provided by a first chamber filled with a compressible fluid such as air behind the acoustic sensing diaphragm and an oil reservoir connected by a capillary tube to a second chamber filled with a substantially incompressible fluid such as oil and exposed to ambient pressure via a compliant diaphragm.

In another aspect of the invention, the outputs of an array of sensors are combined by optical time division multiplexing on an optical fiber bus.

BRIEF DESCRIPTION OF THE DRAWINGS

The features and advantages of the present invention will be understood from reading the following detailed description in conjunction with the drawings in which.

DETAILED DESCRIPTION

Figure 1A:
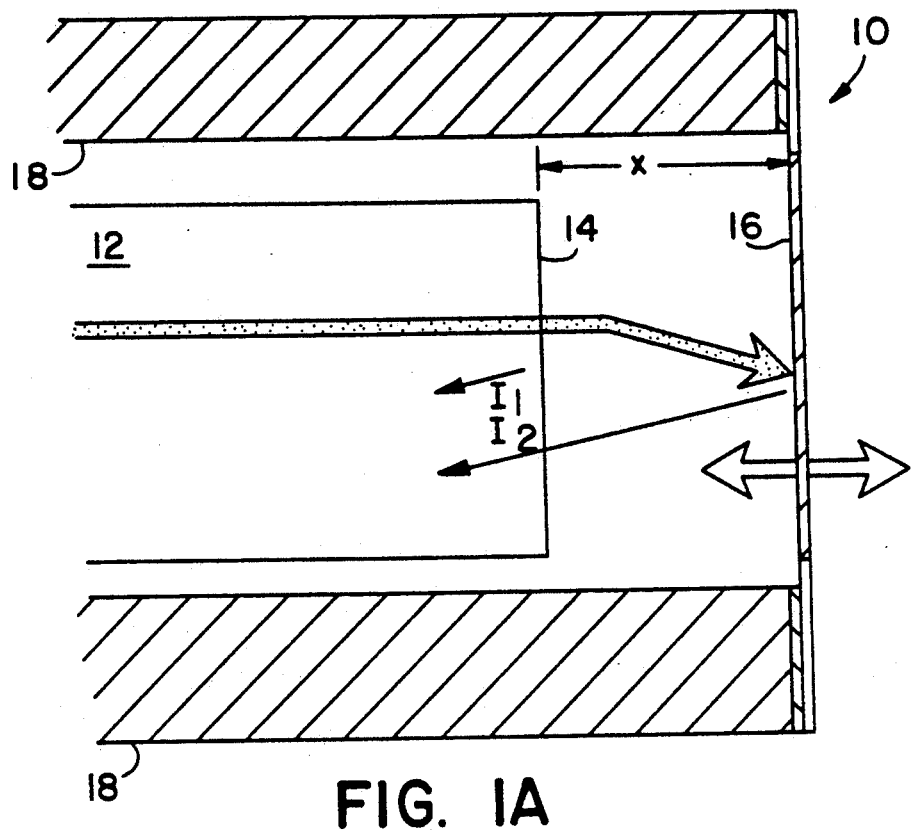
FIGS. 1A and 1B illustrate the operation of a sensor portion of a diaphragm-type, interferometric-based, acoustic sensor.

Referring to the Figures in which like components are identified by like reference numerals throughout, FIG. 1A shows a schematic cross-section of a diaphragm-type, interferometric-based acoustic sensor 10. A laser (not shown) or other suitable source injects an input light beam (heavy arrow) into a single-mode optical fiber 12. The input beam is partially reflected from the fiber end 14, and the transmitted remainder is incident on a thin, reflective diaphragm 16 that moves (open arrows) in response to acoustic waves incident on the diaphragm. The beam $I_1$ reflected from the fiber end 14 and the beam $I_2$ reflected from the diaphragm 16 interfere, and both reflected beams are conducted through the fiber 12 back toward the laser and a suitable photodetector (not shown). (In FIG. 1A, the beams are shown separated and angled for clarity.)

It will be appreciated that the total intensity I of the reflected beams $I_1$ and $I_2$ depends on the separation between the fiber end 14 and the diaphragm 16, among other factors. For a single reflection from the diaphragm 16, the fiber end and diaphragm act like the two mirrors of an unbalanced Michelson interferometer, and the beam intensity relationship is given by:

$$I = I_1 + I_2 + 2(I_1 \cdot I_2)^{\frac{1}{2}} \cos \phi$$

where $\phi$ is the optical phase difference between the beams $I_1$ and $I_2$ given by:

$$\phi = \frac{2\pi n x}{\lambda}$$

where n is the index of refraction of the medium between the fiber end 14 and the diaphragm 16, x is the distance between the fiber end 14 and the diaphragm 16, and $\lambda$ is the wavelength of the reflected light. As described further below, the distance x, and thus the intensity I, varies in response to acoustic waves incident on the diaphragm 16.

It will be appreciated that under suitable conditions multiple reflections between the fiber end 14 and the diaphragm 16 can occur. For example, a suitable coating may be applied to the fiber end 14, if desired, to increase the end's reflectance, and the fiber end 14 and diaphragm 16 would thus act like the two mirrors of a Fabry-Perot etalon. The intensity of the combined reflected beams for such conditions can be easily determined for various reflectance values from well known expressions such as those given in "An Improved Interferometric Pressure Optrode," R. Lieberman et al., Proc. SPIE, vol. 838 Fiber Optic and Laser Sensors V, pp. 49–59 (1987). One sensor employing a Fabry-Perot etalon to sense pressure or displacement is described in U.S. Pat. No. 4,897,542 to Dakin et al. It will be appreciated that a greater change in intensity for a given acoustic input would be provided by an etalon having higher finesse than a Michelson interferometer, although at a cost of reduced linear range and more stringent alignment requirements.

Figure 1B:
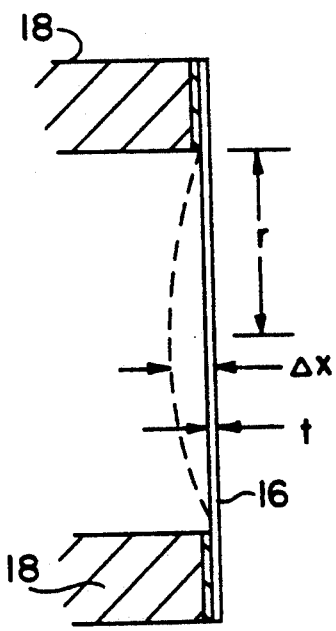

As shown in FIG. 1B, the distance x between the fiber end 14 and diaphragm 16 varies by an amount $\Delta x$ in response to an acoustic wave incident on the diaphragm. For the arrangement illustrated, the relationship between the change in distance, $\Delta x$, between the fiber end 14 and the diaphragm's midpoint and a change in pressure, $\Delta P$, on the surfaces of the diaphragm is given by:

$$\frac{\Delta x}{\Delta P} = \frac{3(1 - u^2)}{16Y} \cdot \frac{r^4}{t^3}$$

where u is the diaphragm's Poisson's ratio, r is the diaphragm's unsupported radius, t is the diaphragm's thickness, and Y is the diaphragm's Young's modulus. Such motion can be converted to an optical phase change, $\Delta \phi$, given by the expression:

$$\Delta \phi = \frac{2\pi \Delta x}{\lambda}$$

which can be substituted into the foregoing to determine a phase sensitivity, $\Delta \phi / \Delta P$, given by the expression:

$$\frac{\Delta \phi}{\Delta P} = \frac{3\pi(1 - u^2)}{8Y\lambda} \cdot \frac{r^4}{t^3}$$

A prototype of the configuration shown in FIGS. 1A and 1B was constructed of optical quality fused quartz whose low thermal expansion coefficient minimized temperature-induced changes of the fiber end-diaphragm distance. The diaphragm 16 was disposed in air at a distance X of 25 micrometers ($\mu$m) from the uncoated fiber end 14; the reflective area of the diaphragm 16 was about 5 millimeters (mm) in diameter. The diaphragm 16 was a fused quartz plate having a thickness t of about 18 $\mu$m. A first-surface reflector was formed by evaporating a 1-$\mu$m-thick aluminum coating onto the inner surface of the diaphragm 16, which was then epoxied (as was the fiber 12) to a cylindrical support 18 comprising a glass tube having an outer diameter of about 10 mm.

It can thus be appreciated that the present diaphragm-type interferometric-based acoustic sensor exhibits excellent sensitivity and has a very low parts count with consequent low cost: only a few hundred dollars for the prototype fabricated from optical quality fused quartz. It is believed the cost of the present sensor could be reduced by a factor of ten for quantities of at least a thousand units, which is a level difficult to achieve for fiber coil sensors.

It will be understood that other ways of attaching the diaphragm 16 to the support 18 could be used depending on environmental conditions. For example, rather than an epoxy, which could be attacked by salt water, the adjacent regions of the diaphragm and support could be metallized and anodically bonded, or polished and fitted to form an optical contact.

For such a quartz diaphragm, $u = 0.16$ and $Y = 7.2 \times 10^{10}$ N/m, and substitution into the foregoing expression yields:

$$\frac{\Delta x}{\Delta P} = 1.8 \times 10^{-14} \text{ m}/\mu Pa$$

which is to say that the diaphragm moves a distance of $1.8 \times 10^{-14}$ meters for a change in pressure of one microPascal. For a wavelength of 1300 nanometers, the phase sensitivity was $\Delta\phi/\Delta P = 8.6 \times 10^{-8}$ radian per microPascal, or $-141$ dB re 1 rad/$\mu$Pa.

Figure 2A:
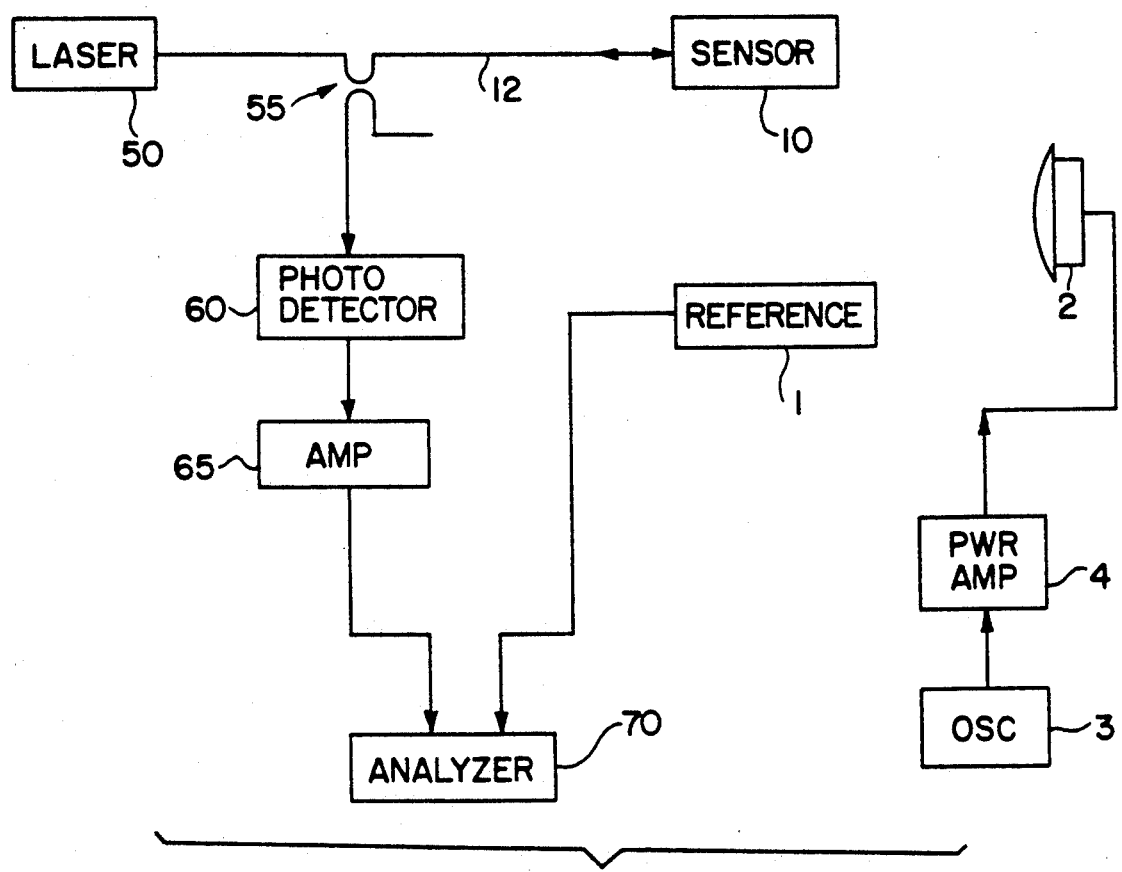
FIG. 2A shows a test configuration for the acoustic sensor.

FIG. 2A shows a test configuration that was used to determine the performance of the prototype sensor 10. An acoustic signal in air was applied to the prototype sensor 10 under test and to a reference standard sensor 1 such as the model SH-101 hydrophone available from Martin Marietta Corporation, Bethesda, Maryland. The acoustic signal was generated by a conventional speaker 2 that was driven by an oscillator 3 and a power amplifier 4.

Light was appropriately coupled into the optical fiber 12, which had a core diameter of about 8 $\mu$m and a numerical aperture of about 0.15, from a model FU-45SDF-3, 1300 nanometer distributed feedback (DFB) diode laser 50 available from Mitsubishi. A conventional 50% fiber optic splitter 55 directed the beams reflected from the uncoated fiber end 14 and diaphragm 16 to an InGaAs photodetector 60 such as the model PD-7006 available from Mitsubishi. The output of the photodetector 60 was amplified by a transimpedance amplifier 65 having a gain of 16 kilohms (K$\Omega$). A model HP-3652 spectrum analyzer 70, which is available from Hewlett-Packard Co., was used to record and analyze the sensors' outputs. It will be appreciated that other components could be used depending on the laser 50 and photodetector 60 selected.

Figure 2B:
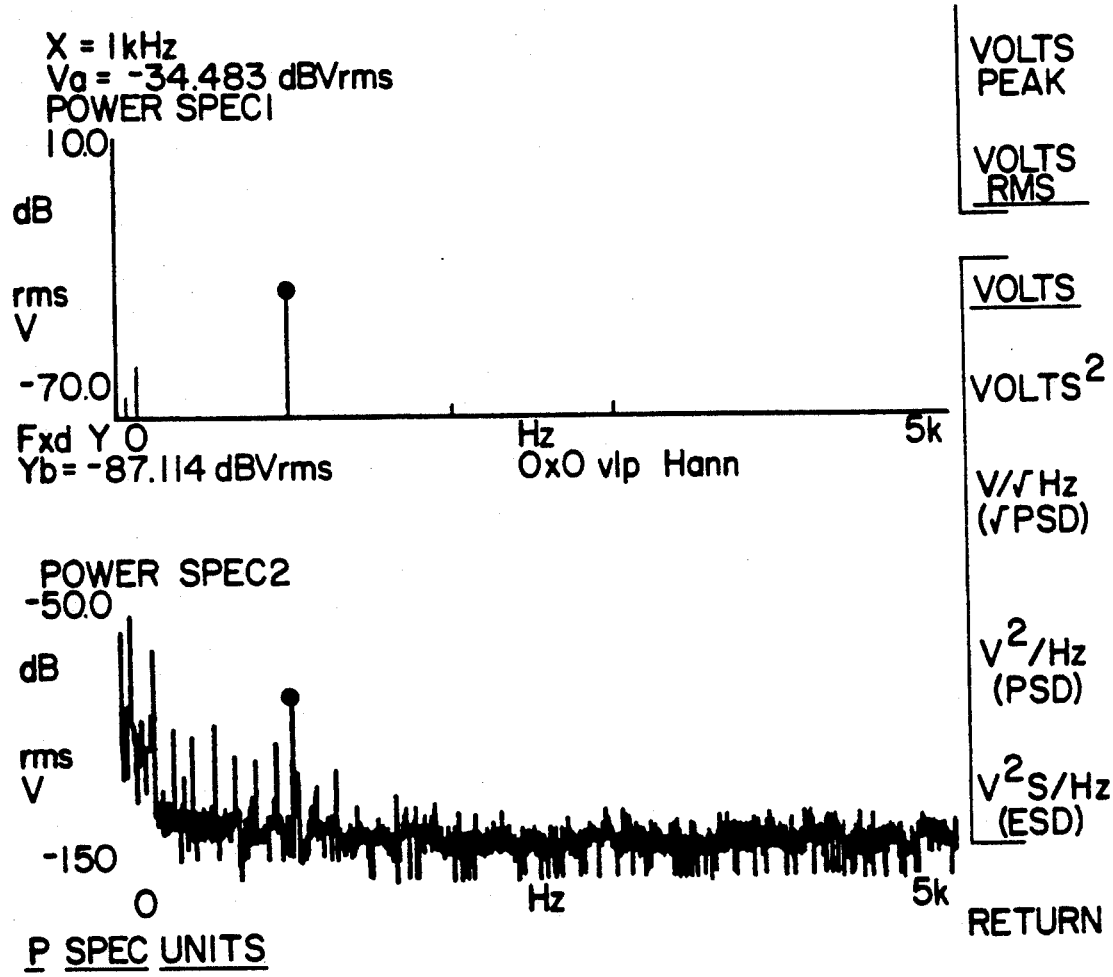
FIG. 2B shows test results obtained using the configuration of FIG. 2A.

A reference measurement by the reference hydrophone 1 of the input acoustic pressure produced by the speaker 2 indicated a sound pressure level of 110.5 dB re 1 $\mu$Pa. The output of the sensor 10 was recorded and analyzed, and its sensitivity was determined to be approximately 144 dB re 1 rad/$\mu$Pa, viz., within 3 dB of the theoretical phase sensitivity described above. It can be noted that no special efforts were made to optimize the low frequency performance of the test configuration since prior experiments had shown good performance to well below 5 hertz (Hz). FIG. 2B is a photograph of the display of the analyzer 70 showing the outputs of the amplifier 65 (upper trace) and the reference sensor 1 (lower trace). The frequency response of the prototype sensor was flat within the standard measurement accuracy for conventional piezoceramic hydrophones from 5 Hz to beyond 5 KHz.

In addition, no effort was made to maximize the sensitivity of the prototype sensor 10 by arranging phase quadrature of the beams reflected from the fiber end 14 and the diaphragm 16, although the test results were obtained at near-quadrature and with the peak-signal-hold function of the spectrum analyzer. Alternatively, quadrature control could be maintained through control of the temperature of the sensor 10. Other ways of achieving phase-quadrature operation would be to control the wavelength of the laser 50 and/or the distance x between the diaphragm and the end of the fiber. Furthermore, a homodyne detection scheme such as that described in the above-cited publication by A. Dandridge et al. could be used.

The average d.c. output voltage of the amplifier 65 was 1.8 volts (V), and the amplifier's a.c. output voltage was about 35 millivolts (mV) peak-to-peak. As described in more detail below, the average d.c. optical power incident on the photodetector 60 was determined from the amplifier's transimpedance gain and the photodetector's responsivity (about 0.8 amp/watt) to be 140 microwatts ($\mu$W). Since the fiber end 14 was uncoated, its reflectivity was about 0.04, and thus the peak-to-peak light intensity swing (I(max)-I(min)) was of the order of 5 $\mu$W. It is important to note that such performance was obtained with relatively relaxed requirements for fiber end/diaphragm alignment. In view of the fiber's large core and numerical aperture, as well as the fiber end's low reflectance, angular alignment within about $\pm 5°$ was sufficient to avoid any substantial degradation in performance.

It will be appreciated that the sensitivity of the optical acoustic sensor is preferably limited by photon-induced shot noise in the photodetector. The optical power necessary to achieve shot-noise limited operation is calculated below for the configuration shown in FIG. 2A The shot noise voltage, $v_n$, at the output of the amplifier 65 is given by the expression:

$$v_n = (2q\eta p_{av}B)^{\frac{1}{2}} R$$

where q is the electronic charge, $\eta$ is the photodetector's responsivity, $p_{av}$ is the average incident optical power, B is the noise bandwidth and R is the transimpedance gain. The signal voltage at the amplifier output is given by the expression:

$$V_{sig} = \eta p_{sig} R$$

where $p_{sig}$ is the signal optical power and the other terms are as previously defined.

The minimum signal optical power is related to the optical phase change by the expression:

$$p_{min} = \frac{2qB}{\eta \Delta \phi^2}$$

For a likely minimum pressure change, $\Delta P_{min}$, of 0 dB re 1 $\mu$Pa, a phase sensitivity of $8.6 \times 10^{-8}$ rad/$\mu$Pa, and a noise bandwidth of 1 Hz, approximately 1 nanowatt at the photodetector will achieve photon-shot-noise-limited operation for the system described above.

Theoretically, the prototype acoustic sensor 10 had a phase sensitivity of $-141$ dB re 1 rad/$\mu$Pa and, for a reflected optical signal of 1 $\mu$W and transimpedance gain of 1 M$\Omega$, a voltage sensitivity of $-143$ dB re 1 v/μPa. These values represent a 50 dB gain in sensitivity compared to other hydrophones such as the Martin Marietta model PCMH-2 that has −193 dB re 1 v/μPa sensitivity and are achievable with no wet-end electronics or hydrophone preamplifiers. The latter characteristics are highly advantageous for hydrophones operated in the deep sea.

When employing a diaphragm as the acoustic sensing element in a deep sea or other high pressure environment, it is usually necessary to compensate for the high pressure to maximize the performance of the sensor with respect to low-amplitude acoustic waves. In accordance with one feature of the present invention, pressure compensation is provided to achieve sensitivity at the minimum acoustical threshold needed for sonar and undegraded operation at depths as great as four kilometers. The present pressure compensation technique involves compression of a gas volume behind the diaphragm to equalize the average static pressure on both side of the diaphragm.

Figure 3:
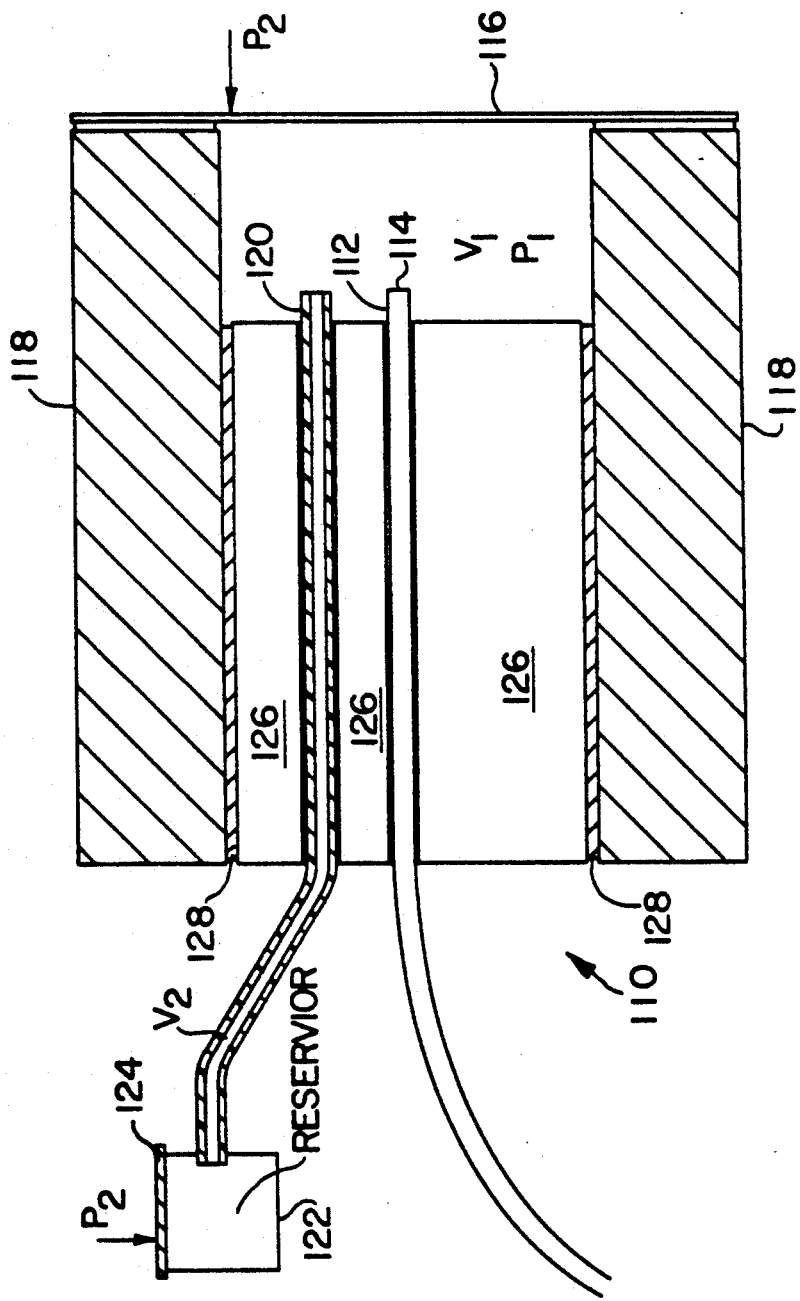
FIG. 3 shows an embodiment of the present acoustic sensor portion.

In one embodiment of a pressure-compensated sensor 110 shown in FIG. 3, an air or other gas volume $V_1$ behind the diaphragm 116 is connected through a gas-filled capillary tube 120 having a volume $V_2$ to a fluid reservoir 122. The reservoir 122 has a compliant cap 124 subject to the ambient pressure $P_2$, and is filled with an incompressible fluid such as mineral oil, mercury, silicone oil, castor oil, ISOPAR (a petroleum distillate available from Exxon Corp.) or the like. The volume $V_2$ preferably communicates directly with the fluid in reservoir 122, and thus the reservoir fluid forms an effective piston in the capillary tube 120. When the pressure $P_2$ increases, the fluid piston moves in the tube 120, and volume $V_2$ decreases so that the gas volume $V_1$ and the pressure $P_1$ behind the reflective diaphragm 116 maintain the relationship $P_1 \cdot V_1 = P_2 \cdot V_2 = C$, where C is a constant for constant temperature. The foregoing relationship will be recognized as Boyle's law.

At a sea depth of 14,284 feet, $P_2$ would be approximately 6000 psi, or approximately 400 atmospheres. For a sensor gas volume $V_1$ of approximately $5 \times 10^{-4}$ cubic inches, the gas volume $V_2$ should be at least approximately 400 times $V_1$, i.e., approximately 0.2 cubic inches. The length of capillary tube 120 would be selected to provide such a volume and to prevent spillage of fluid from the reservoir 122 into the volume $V_1$.

It will be appreciated that pressure compensation is achieved in the embodiment shown in FIG. 3 with a minimum of components. The capillary tube 120 can be directly inserted into the reservoir fluid, thereby avoiding the complexities associated with the bellows mechanism described in the above-cited Tehon et al. patent. It will also be appreciated that the dimensions of the capillary tube 120 can be determined from conventional fluid dynamics and would be selected to provide suitable volume, as described above, and to provide suitable frequency characteristics. For a typical hydrophone application, the tube 120 should transmit low frequency pressure fluctuations, e.g., less than 5 Hz, for pressure compensation but not transmit higher frequency fluctuations for detection by the diaphragm 116.

The volume of the tube should be at least equal to the gas volume $V_2$, i.e., 0.2 cubic inches for this example. The compensating volume is related to the tube's cross-sectional area and length L by the expression:

$$v_2 = \pi \frac{D^2}{4} L$$

where D is the inner diameter of a tube of circular cross-section. For a commercially available TEFLON plastic tube having an inner diameter of 0.02 inches, a tube length of at least 637 inches would provide the proper compensating volume.

The determination of capillary tube dimensions is also influenced by the characteristics of the fluid in the reservoir 122. For example, more viscous fluids can be expected to require larger-diameter capillary tubes. The reservoir fluid should also be selected to have a low vapor pressure to reduce the risk of contamination of the fiber end 114 and diaphragm 116 by fluid vapors.

Referring again to FIG. 3, the optical fiber 112 and capillary tube 120 may be conveniently disposed in a spacer block 126. The block 126 may be formed of any material capable of withstanding the sensor environment and providing a stable positioning of the fiber end 114 with respect to the diaphragm 116. (For deep-sea applications, low thermal expansion is less important due to the sea's substantially constant temperature at depth.) The block 126 could be affixed, for example with an adhesive 128, to a cylindrical support 118, and the fiber 112 and tube 120 could be similarly affixed within channels through the block 126. It will be appreciated that other arrangements could be provided, such as a suitably shaped structure comprising a one-piece combination of the support 118 and block 126 having channels for accommodating the fiber 112 and tube 120.

Figure 4A:
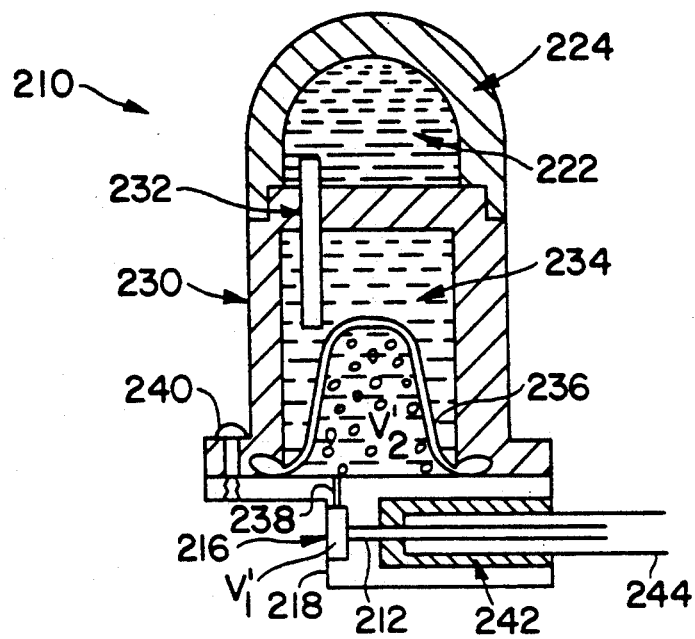
FIGS. 4A and 4B show orthogonal views of another embodiment of the present acoustic sensor.
Figure 4B:
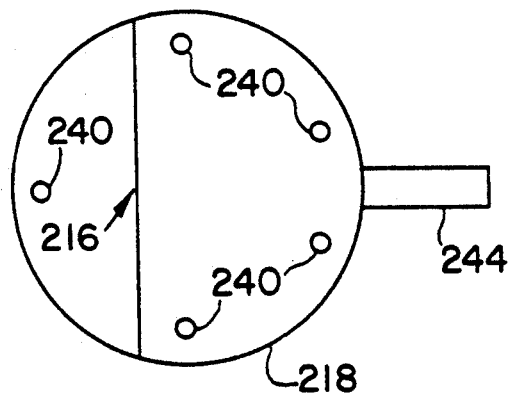

FIGS. 4A and 4B show cross-section and bottom views of another embodiment of an acoustic sensor having pressure compensation. The sensor 210 has a compliant cap 224 that surrounds a first fluid reservoir 222 bounded by a solid metal or plastic casing 230. A capillary tube 232 passes through the casing 230 and connects the first reservoir 222 to a second fluid-filled chamber 234 on the opposite side of the casing. Within the second chamber 234 is disposed a bellofram 236 that encloses a volume $V_{2'}$ filled with a gas such as air or another highly compressible fluid. The volume $V_{2'}$ communicates through a suitable tube or channel 238 with a volume $V_{1'}$ disposed between a sensing diaphragm 216 and an optical fiber 212.

Also in FIGS. 4A and 4B, the sensor 210 includes a support structure 218 that is configured for sealed attachment, for example by screws or other fasteners 240, to the casing 230. A suitable potted termination 242 for a cable 244 including the fiber 212 would also be provided in the support structure. The overall dimensions of the sensor 210 would likely be less than 1.25 inches in diameter by about 1.5 inches high.

The function of the bellofram 236 in combination with the Helmholtz tube 232 is substantially similar to that of the capillary tube 120 shown in FIG. 3. The Helmholtz tube 232 acts as a pressure low pass filter equalizing the average static pressures of the first reservoir 222 and second chamber 234. Since the fluid in the chambers is preferably substantially incompressible, that is to say it has low compliance, the highly compliant gas-filled volume $V_{2'}$ of the bellofram transfers the ambient pressure on the cap 224 to the volume $V_{1'}$ behind the diaphragm 216 through the operation of Boyle's law as described above. An advantage provided by the embodiment illustrated in FIGS. 4A and 4B is its wider selection of fluids for chambers 222 and 234 due to the absence of any possible contamination by chamber fluid vapor of the sensor's fiber end 214 and diaphragm 216.

Although FIGS. 3, 4A, and 4B show two possible pressure compensation configurations, it will be understood that other mechanisms similar to and operating by the same principles can be developed.

Figure 5:
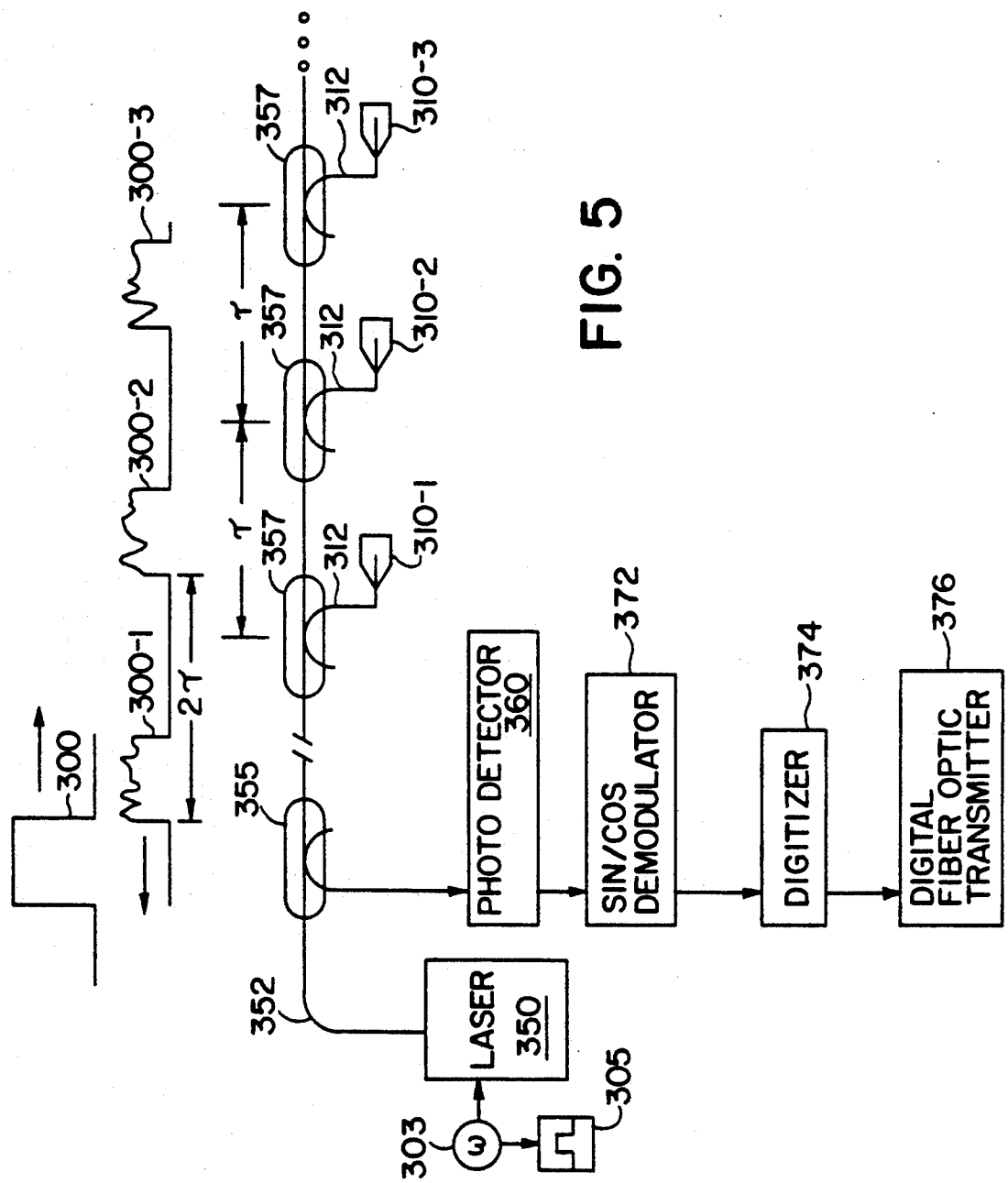
FIG. 5 shows a sensor array and associated signal processing components.

In another aspect of the invention, optical time division multiplexing of the acoustic signals from a plurality of sensors may be provided. Referring to FIG. 5, an optical pulse 300 launched by a source 350 is conducted by an optical fiber bus 352 to an array of acoustic sensors 310-1, 310-2, 310-3, etc., each having its input/output fiber 312 connected to the bus by a respective suitable coupler 357. The sensors 310-1, 310-2, 310-3 would reflect intensity-modulated replicas 300-1, 300-2, 300-3, respectively, of the pulse 300 back to a directional or 3-dB optical coupler 355 that would direct the replicas to a photodetector 360.

For equally spaced sensors 310, the replica pulses would be temporally separated by the round-trip travel time, $2\tau$, between adjacent sensors. It will be appreciated that the temporal extent of the pulse 300 must be narrow enough to prevent the overlap of replica pulses from different sensors 310, whether or not those sensors were equally spaced. Moreover, the pulse 300 must be wide enough (or the distance x must be small enough) to permit the reflections from the fiber end and diaphragm in each sensor to overlap. Time-division multiplexing the outputs of an array of sensors in this way minimizes the amount of optical fiber required and permits the use of a single photodetector 360 and associated detection electronics, which are described in more detail below.

In evaluating the timing considerations relevant to a single linear optical bus 352 that serves one hundred thirty sensors 310, it can first be noted that a single input pulse 300 yields one hundred thirty replicas. For a one-way maximum distance of 5 Km along the array, the time for the input pulse 300 to reach the farthest sensor (e.g., sensor 310-130) and that sensor's replica to return is 50 $\mu$sec, which establishes a sensor sampling rate of 20 KHz that is well above the minimum Nyquist sampling rate needed for typical acoustic sensor applications.

Numerous multiplexing and demodulation techniques that could be used with the present sensors are described in the above-cited patents and publications which are briefly discribed below.

The time-division-multiplexed phase generated carrier method or the laser frequency modulation phase generated carrier method can be used to detect small signal phase shifts and to eliminate signal fading caused by large environmental drifts. This is accomplished by introducing a large amplitude phase shift at a frequency which is well outside the frequency range of interest. The large amplitude signals carry, as sidebands, the signals of interest. Sine and cosine signal processing can then be used to derive a small acoustic signal in addition to a large environmental drift.

The path matched differential interferometry method uses two interferometers. The first interferometer is used as a sensing interferometer and the second interferometer is used as a compensating interferometer. This method can be used with an optical source, such as a laser diode or LED, whose coherence length is shorter than the differential path distance in the sensing interferometer. In this case, the differential path length is twice the distance between a fiber end and a mirrored diaphragm. In addition, the compensating interferometer has a path mismatch similar to the path mismatch of the sensing interferometer.

The wavelength tuning technique uses a laser diode whose central wavelength is controlled by thermal means to keep a remote interferometer in quadrature. This technique may be used for single sensor demodulation, but has limited applicability to multichannel operation.

The preferred techniques are the time-division-multiplexed phase generated carrier (PGC) and the laser frequency modulation PGC passive demodulation methods, provided that the optical phase difference between the beams reflected from the fiber end and diaphragm are sufficiently large. In addition, PGC demodulation advantageously permits the acoustic sensor to recover the acoustic signal in the presence of drift signals, e.g., due to intensity fluctuations of the laser. It will be understood that alternate means of demodulation or quadrature detection can also be utilized.

To implement PGC demodulation, the source 350 would advantageously be capable of launching either a single or dual wavelength pulse, and its intensity would be sinusoidally modulated by a suitable oscillator 303 that was gated by a pulse generator 305. A conventional sine/cosine demodulator 372 receives the appropriately conditioned output of the photodetector 360 and produces a demodulated signal representative of the acoustic environment of the sensors 310. The demodulated signal produced by the demodulator 372 could then be digitized by a suitable digitizer 374 and further processed, or the digitized signal could be sent to a digital fiber optic transmitter 376 for communication to a remote location if desired.

The phase-generated-carrier demodulator uses a wavelength tunable laser and reception electronics that derive the acoustic signal even in the presence of interferometric fading. The receiver derives signals proportional to the sine and cosine of the total phase change in the interferometer. Quadrature demodulation is achieved by using sine and cosine signal processing as described in the paper by Dandridge et al., discussed above and which is incorporated here by reference. The PGC demodulator requires only a few integrated circuits to implement and has been in use by the Naval Research Laboratories since 1982.

From an optical power standpoint, array architectures that utilize matrices of sub-array bus fibers fed by respective lasers are more efficient than architectures that rely on a single bus fiber. For example, one hundred sensors would be better served by ten lasers and ten sub-array bus fibers rather than one laser and one bus fiber. Nevertheless, such an array having a plurality of sub-array bus fibers could have its sensors staggered in groups so that the replica pulses returned by the sub-arrays could be interleaved on a single output bus, forming a replica sequence comparable to that from the linear bus array described in connection with FIG. 5.

Moreover, it may be possible to achieve signal enhancements through the use of multiplex pulses or to reduce the sampling rate to conserve electrical power.

The foregoing description is intended in all senses to be illustrative rather than restrictive. Other embodiments of the invention will suggest themselves to those of ordinary skill in the art, and those embodiments that fall within the spirit and scope of the following claims are intended to by included therein.

What is claimed is:

1. An apparatus for sensing acoustic waves in a fluid medium comprising:

a light source;

an optical fiber for conducting light from the light source to an interferometric sensor and for conducting an interference light signal characteristic of the acoustic waves from the interferometric sensor to a photodetector for transducing the interference light signal into an electrical signal; and means for processing the electrical signal into a signal characteristic of the acoustic waves;

said interferometric sensor comprising a first chamber filled with a substantially compressible fluid and an acoustic sensing member on a surface of the first chamber, wherein the optical fiber has a partially reflective end disposed in the first chamber, the internal surface of the acoustic sensing member is at least partially reflective, is disposed at a predetermined distance from the fiber end and confines the substantially compressible fluid, the external surface of the sensing member is immersed in the fluid medium and deforms in response to acoustic waves in the fluid medium, thereby varying the distance between the optical fiber end and the internal surface of the acoustic sensing member and forming the interference light signal; and said interferometric sensor further comprising means for equalizing the hydrostatic pressures of the fluid medium and the substantially compressible fluid over a predetermined frequency range, the equalizing means including a second chamber filled with a substantially incompressible fluid and means for interconnecting the first and second chambers, the second chamber having a pressure equalizing member on a surface of the second chamber, the internal surface of the pressure equalizing member confining the substantially incompressible fluid, and the external surface of the pressure equalizing member being immersed in the fluid medium and deforming in correspondence with pressure changes in the fluid medium over the predetermined frequency range.

2. The apparatus of claim 1, wherein the means for interconnecting the first and second chambers is a capillary tube through which the substantially compressible and substantially incompressible fluids are in direct contact.

3. The apparatus of claim 1, wherein the means for interconnecting the first and second chambers isolates the substantially compressible fluid from the substantially incompressible fluid.

4. An array for sensing acoustic waves in a fluid medium comprising:

a light source;

means for modulating light from the light source;

means for coupling the modulated light into an optical fiber bus;

means for coupling light between the optical fiber bus and each of a plurality of acoustic sensors disposed in a mutually spaced relationship;

means for coupling light from the optical fiber bus to a photodetector for transducing the light into an electrical signal;

means for processing the electrical signal into a signal characteristic of the acoustic waves;

each acoustic sensor comprising an optical fiber for conducting light from the optical fiber bus to an interferometric sensor and for conducting an interference light signal characteristic of the acoustic waves from the interferometric sensor to the optical fiber bus;

said interferometric sensor comprising a first chamber filled with a substantially compressible fluid and an acoustic sensing member on a surface of the first chamber, wherein the optical fiber has a partially reflective end disposed in the first chamber, the internal surface of the acoustic sensing member is at least partially reflective, is disposed at a predetermined distance from the fiber end and confines the substantially compressible fluid, the external surface of the sensing member is immersed in the fluid medium and deforms in response to acoustic waves in the fluid medium, thereby varying the distance between the optical fiber end and the internal surface of the acoustic sensing member and forming the interference light signal; and said interferometric sensor further comprising means for equalizing the hydrostatic pressures of the fluid medium and the substantially compressible fluid over a predetermined frequency range, the equalizing means including a second chamber filled with a substantially incompressible fluid and means for interconnecting the first and second chambers, the second chamber having a pressure equalizing member on a surface of the second chamber, the internal surface of the pressure equalizing member confining the substantially incompressible fluid, and the external surface of the pressure equalizing member being immersed in the fluid medium and deforming in correspondence with pressure changes in the fluid medium over the predetermined frequency range.

* * * * *